United States Patent
Wang et al.

(10) Patent No.: US 7,260,055 B2
(45) Date of Patent: Aug. 21, 2007

(54) METHOD FOR REDUCING CHANNEL ESTIMATION ERROR IN AN OFDM SYSTEM

(75) Inventors: Zhongjun Wang, Singapore (SG); Lee Guek Yeo, Singapore (SG); Xiaodan Gan, Singapore (SG)

(73) Assignee: Agency for Science, Technology, and Research, Singapore (SG)

( * ) Notice: Subject to any disclaimer, the term of this patent is extended or adjusted under 35 U.S.C. 154(b) by 1008 days.

(21) Appl. No.: 10/449,992

(22) Filed: May 30, 2003

(65) Prior Publication Data

US 2004/0240376 A1 Dec. 2, 2004

(51) Int. Cl.
- *H04J 9/00* (2006.01)
- *H04J 11/00* (2006.01)
- *H04J 1/16* (2006.01)
- *H03D 1/00* (2006.01)

(52) U.S. Cl. .............. 370/208; 370/210; 370/252; 375/340

(58) Field of Classification Search ............... 370/208, 370/210, 204; 375/340
See application file for complete search history.

(56) References Cited

U.S. PATENT DOCUMENTS

| | | | |
|---|---|---|---|
| 5,371,551 A | 12/1994 | Logan et al. | |
| 5,583,560 A | 12/1996 | Florin et al. | |
| 5,903,610 A | 5/1999 | Skold et al. | 375/285 |
| 5,970,208 A | 10/1999 | Shim | |
| 6,038,367 A | 3/2000 | Abecassis | |
| 6,233,389 B1 | 5/2001 | Barton et al. | |
| 6,324,338 B1 | 11/2001 | Wood et al. | |
| 6,487,253 B1 | 11/2002 | Jones, IV et al. | 375/260 |
| 6,618,452 B1 * | 9/2003 | Huber et al. | 375/343 |
| 2001/0014206 A1 | 8/2001 | Artigalas et al. | |
| 2001/0036235 A1 | 11/2001 | Kadous | 375/341 |
| 2001/0047516 A1 | 11/2001 | Swain et al. | |
| 2001/0056434 A1 | 12/2001 | Kaplan et al. | |
| 2002/0016971 A1 | 2/2002 | Berezowski et al. | |

(Continued)

FOREIGN PATENT DOCUMENTS

EP 1235398 8/2002

OTHER PUBLICATIONS

IEEE 802.11a-1999 standard, Oct. 1999, p. 7.*

(Continued)

*Primary Examiner*—Lana Le
*Assistant Examiner*—Jianye Wu
(74) *Attorney, Agent, or Firm*—Saile Ackerman LLC; Stephen B. Ackerman

(57) ABSTRACT

A method for channel response estimation for an OFDM communication system based on a certain normal training symbols plus one virtual training symbol begins with receiving at least one preamble symbol of a transmitted data frame. A first channel state information is estimated from the at least one preamble symbol. At least one signalling symbol is then received and equalized and a rate factor and a length factor are extracted from the at least one signalling symbol. A virtual training symbol is formed from the rate factor and the length factor. A second channel state information is estimated from the at least one preamble symbol and the virtual training symbol. The data symbols are equalized by performing channel correction on data symbols with the second channel estimation and pilot sub-carriers in each of the plurality of data symbols.

54 Claims, 6 Drawing Sheets

U.S. PATENT DOCUMENTS

| | | | |
|---|---|---|---|
| 2002/0122381 A1 | 9/2002 | Wu et al. | 370/208 |
| 2003/0223354 A1* | 12/2003 | Olszewski | 370/208 |
| 2004/0001563 A1* | 1/2004 | Scarpa | 375/326 |
| 2004/0004934 A1* | 1/2004 | Zhu et al. | 370/208 |
| 2004/0004935 A1* | 1/2004 | Zhu et al. | 370/208 |
| 2004/0005018 A1* | 1/2004 | Zhu et al. | 375/340 |
| 2004/0005022 A1* | 1/2004 | Zhu et al. | 375/365 |

OTHER PUBLICATIONS

"OFDM for Wireless Multimedia Communications," Van Nee and Prasad, Artech House Publishers, 2000.

Cheon et al., "Effect of Channel Estimation Error in OFDM-Based WLAN," IEEE Comm. Letter, vol. 6, No. 5, May 2002, pp. 190-192.

Thomas et al., "An Integrated 802.11a Baseband and MAC Processor," Proc. IEEE Int. Solid State Circuits Conf. (ISSCC), Feb. 2002, pp. 126-127.

"Information Tech.—Telecommunications & Info. Exchange Between Sys.—Local & Metro. Area Networks-Specific Requirements—Part II: Wireless LAN Medium Access Control (MAC) & Physical Layer (PHY) Spec.", LAN MAN Standards, ANSI/IEEE Std 802.11 (a) Sep. 1999.

"OFDM Channel Estimation by Singular Value Decomposition," Edfors et al., IEEE Trans. on Comm., vol. 46, No. 7, Jul. 1998, pp. 931-939.

* cited by examiner

METHOD FOR REDUCING CHANNEL ESTIMATION ERROR IN AN OFDM SYSTEM

BACKGROUND OF THE INVENTION

1. Field of the Invention

This invention relates generally to communication systems. More particularly, this invention relates to estimation of channel responses as involved in Orthogonal Frequency Division Multiplexing (OFDM) communication systems.

2. Description of Related Art

Orthogonal Frequency Division Multiplexing (OFDM) is a multi-carrier modulation scheme resistant to multipath interference and frequency selective fading in communication systems such as wireless local area network (WLAN) and digital audio/video broadcasting. The technique divides the channel bandwidth into multiple narrow band subchannels or sub-carriers, which are used for transmitting data in parallel with high efficiency spectrum usage, as described in "OFDM for Wireless Multimedia Communications", Van Nee and Prasad, Artech House Publishers, 2000.

In 1999, OFDM was selected by the IEEE 802.11 standardization committee as the technology for a 5 GHz WLAN standard—WLAN Medium Access Control (MAC) and Physical Layer (PHY) Specification: High-speed Physical Layer in the 5 GHz Band, as described in the "Information Technology—Telecommunications and Information Exchange Between Systems—Local and metropolitan area networks—specific requirements—Part 11: "Wireless LAN Medium Access Control (MAC) and Physical Layer (PHY) Specifications", sponsored by the LAN MAN Standards Committee of the IEEE Computer Society, ANSI/IEEE Std 802.11(a), September 1999. The IEEE 802.11(a) standard divides the 5150 MHz to 5350 MHz frequency band and the 5725 MHz to 5825 MHz frequency band into 12 20-MHz communication channels. Each of these 20-MHz channels is composed of 52 narrow band sub-carriers, which are modulated using binary phase shift keying (BPSK), quadrature phase shift keying (QPSK), 16-quadrature amplitude modulation (16-QAM), or 64-QAM to support data rates up to 54 Mbps in 16.6 MHz occupied bandwidth on 20 MHz channelization. A typical block diagram of the baseband processing of an OFDM transceiver in the IEEE 802.11(a) WLAN is shown in FIG. 1. In the transmitter path 5, binary input data 10 are encoded by an industry standard ½ rate convolutional encoder 15. The coding rate can be increased to ⅔ or ¾ by puncturing the coded output bits to accommodate the desired data rate which is one of 6 Mbps, 9 Mbps, 12 Mbps, 18 Mbps, 24 Mbps, 36 Mbps, 48 Mbps or 54 Mbps. After interleaving with an interleaver circuit 20, the binary values are mapped with a mapping circuit 25 onto BPSK, QPSK, 16-QAM or 64-QAM constellations according to the chosen data rate. A time-domain OFDM symbol is thus obtained from a Fast Fourier Transform circuit 35 by applying a length N(N=64) inverse fast Fourier transform (IFFT) to those modulation values 30, $Y_T(0), Y_T(1), \ldots, Y_T(N-1)$. The N complex values output from the IFFT 35 are then applied to the sub-carrier multiplexer 40 to form the baseband discrete time samples. The resulting digital samples in the time domain are then converted by the Digital-to-Analog (D/A) converter 45 to analog signals, which are further up-converted to the 5 GHz band, amplified and transmitted to the over-the-air channel 50 through an antenna.

The transmitted signal suffers from some distortions in the channel 50, which usually can be represented by a channel impulse response, h(t) 55, and an additive noise 60, v(t) 65, in the time-domain. The resulting corrupted signal from the channel 50 is the input to the OFDM receiver 70.

The OFDM receiver 70 basically performs the reverse operations of the transmitter 5. The received RF signal is down-converted to a baseband signal and sent to an Analog-to-Digital (A/D) converter 75. The digital baseband samples are then demultiplexed by the demultiplexing circuit 80 to reconstruct the transmitted time-domain OFDM symbol structure. The digital samples of the demultiplexed signal are applied to a Fast Fourier Transform circuit 85, which creates a frequency-domain OFDM symbol with N complex values, $Y_R(0), Y_R(1), \ldots, Y_R(N-1)$ 90. The N complex values, $Y_R(0), Y_R(1), \ldots, Y_R(N-1)$ 90 are applied to a the Modulation De-Mapping circuit 95, which converts the complex values to a binary sequence. The binary sequence is the input to the De-Interleaver circuit 100, which correctly orders the sequence to reflect the original structure of the encoded transmitted data. The de-interleaved data sequence is applied to the Viterbi Decoder 105 for recovery of the transmitted data to form the receiver's output data 110.

To properly receive a data frame in burst-mode transmission, the receiver 70 first has to detect the arrival of a frame, find the unknown beginning sample instant of the first and subsequent OFDM data symbols, and, estimate/correct for any carrier frequency offset imparted to the sub-carriers due to variation in the nominal values of the oscillator frequencies in both the transmitter 5 (remote device) and receiver 70 (local device), using structured training symbols 117, 118, and 119 contained in a frame preamble 115 as shown in FIG. 2. After that, the receiver 70 can perform an FFT to convert a time-domain OFDM data symbol into N frequency-domain complex values, $Y_R(0), Y_R(1), \ldots, Y_R(N-1)$ 90. Ideally, these values are expected to be same as $Y_T(0), Y_T(1), \ldots, Y_T(N-1)$ 30, but they are usually distorted by the channel. Thus, before they are used as the input to the de-mapping 95, the values, $Y_R(0), Y_R(1), \ldots, Y_R(N-1)$ 90, should be compensated first so that the equalized values, $\hat{Y}_R(0), \hat{Y}_R(1), \ldots, \hat{Y}_R(N-1)$, are the good estimations of $Y_T(0), Y_T(1), \ldots, Y_T(N-1)$ 30.

When a wireless channel is typically modelled in the time domain as the joint effort of multipath effects with a channel impulse response, h(t) 55 and an additive noise, v(t) 65, the frequency-domain relation between the $Y_T(k)$ and $Y_R(k)$ can be expressed as $$Y_R(k) = H(k) \cdot Y_T(k) + V(k), \; k=0 \text{ to } N-1 \qquad (1)$$

where:

V(k) is the frequency-domain additive noise.

H(k) is the channel transfer function which is usually called as channel state information.

The channel estimation thus is simply to find the estimation of channel state information, $\hat{H}(k)$, so that $\hat{Y}_R(k) = Y_R(k)/\hat{H}(k)$ approximates $Y_T(k)$ as closely as possible.

Different algorithms have been proposed for channel estimations. The Minimum Mean Square Error (MMSE) based algorithms give low mean square estimation errors, but may be either impractical or not robust because they are of high computational complexity and usually require an assumption of the channel statistics. "OFDM channel estimation by singular value decomposition", Edfors et al., IEEE Trans. On Communications, vol. 46, no. 7, pp.931-939, July 1998 describes such a technique for channel estimation. On the other hand, the Least Square (LS) estimation, which is given by $$\hat{H}(k) = Y_R(k)/Y_T(k), \; k=0 \text{ to } N-1 \qquad (2)$$

is much simpler and easier to be implemented. However, when compared with the MMSE estimation, the LS estimation yields a higher mean square estimation error, which will translate to degradation in system performance in terms of higher bit error rate (BER) and packet error rate (PER) and should be further reduced to an acceptable level in practice.

U.S. Patent Application Publication 2001/0036235 A1 (Kadous), teaches a method and apparatus for improving LS channel estimate in OFDM communication systems. The method and apparatus allows a channel estimate to be determined independent of having knowledge on channel statistics. Channel estimation is performed by determining and then utilizing an LS estimate and an interpolation coefficient for each transmitting antenna. The interpolation coefficient is determined independently from the statistics of the channel, i.e., without needing the channel multipath power profile (CMPP). The interpolator coefficient is multiplied by an LS estimate for each transmitting antenna to determine the channel estimate for each channel.

U.S. Pat. No. 6,487,253 (Jones, IV, et al.) illustrates another method for achieving improved channel response estimation in an OFDM system in the presence of interference. The interference and/or noise present on the received training symbols are estimated first. Based on the measured noise and/or interference, a weighting among training symbols is developed. Channel response is then estimated based on a weighted least square procedure.

When these two techniques can be employed to enhance the LS channel estimation in an OFDM system, the derivation of robust interpolation coefficients or weighting factors may require multiple transmitter or receiver antennas.

In a wireless LAN system, which performs burst-mode transmission of data frames with limited length, the channel state information can be assumed to be constant within the transmission duration of a frame, and, therefore, the channel estimation is commonly performed by the use of one or more known OFDM symbols, which are usually called training symbols. In the IEEE 802.11a standard, the two long training symbols 118 and 119 contained in the preamble 115 of each data frame can be used for estimating the channel state information. It is easy to see that, by averaging the LS estimations of channel state information obtained from the prescribed training symbols, the effects of the channel noise can be reduced to some extent. By averaging the two identical long training symbols in the IEEE 802.11a WLAN, for example, the reference amplitudes and phases for doing coherent demodulation can be obtained with a noise level that is 3 dB lower than the noise level of data symbols. "An integrated 802.11(a) baseband and MAC processor", Thomson et al., Proc. IEEE Int. Solid State Circuits Conf. (ISSCC), February 2002, pp.126-127 describes an 0.25 µm CMOS baseband and MAC processor for the IEEE 802.11 (a) WLAN standard that averages the two long training symbols 118 and 119 of FIG. 2 for channel estimation/correction. U.S. Pat. No. 5,903,610 (Skold, et al.) illustrates a receiver of a digital radio communication system including a combined channel estimate that is formed by averaging a long channel estimate with a short channel estimate. Also, "Effect of channel estimation error in OFDM-based WLAN", Cheon et al., IEEE Communication Letters, vol.6, pp.190-192, May 2002 examines the performance degradation due to the channel estimation error in an OFDM-based WLAN. The average effective Signal to Noise ratio and average bit error probabilities (BEPs) are derived in a Rayleigh fading channel. Cheon et al. have demonstrated the advantages of averaging the two long training symbols 118 and 119 of FIG. 2 for channel estimation over using a single training symbol.

The choice of the number of training symbols that can be used for channel estimation is a trade-off between a good channel estimation performance and a short training time, because the training symbols contain no actual data information. In the training structure (preamble) 115 of FIG. 2, the total training length is 16 µs. The periods $t_1$ to $t_{10}$ contain short training symbols 117 and T1 and T2 denote long training symbols 118 and 119. The dashed boundaries in the figure denote repetitions due to the periodicity of the inverse Fourier transform. A short OFDM training symbol 117 consists of 12 sub-carriers, which are modulated by the elements of a fixed spectral sequence as defined in paragraph 17.3.3 of IEEE 802.11(a) standard. A long OFDM training symbol 118 and 119 consists of 53 sub-carriers (including a zero value at dc), which are modulated by the elements of the spectral sequence as defined in paragraph 17.3.3 of IEEE 802.11(a) standard.

The long OFDM training symbols are followed by the OFDM SIGNAL symbol 120, which contains the RATE 121 and the LENGTH 123 fields of the TXVECTOR as defined in paragraph 17.2.2 of IEEE 802.11(a) standard. The encoding of the SIGNAL field 126 into an OFDM symbol 120 proceeds with convolutional encoding (R=½), interleaving, less noise sensitive BPSK mapping, pilot insertion, and OFDM modulation. The contents of the SIGNAL field 126 are not scrambled. The SIGNAL field 126 is composed of 24 bits, as illustrated in FIG. 2. The four bits 0 to 3 121 shall encode the RATE. Bit 4 122 is reserved for future use. Bits 5-16 shall encode the LENGTH field 123 of the TXVECTOR, with the least significant bit (LSB) being transmitted first. Bit 17 124 is a positive parity (even parity) bit for bits 0-16. The bits 18-23 constitute the SIGNAL TAIL field 125, and all 6 bits are set to zero. The RATE field 121 conveys information about the type of modulation and the coding rate as used for the rest of the frame. The 4 bits of RATE field 121 are set according to the values in Table 1. The LENGTH field 123 is an unsigned 12-bit integer that indicates the number of octets in the protocol service data unit that the MAC is currently requesting the PHY to transmit. This value is used by the PHY to determine the number of octet transfers that will occur between the MAC and the PHY after receiving a request to start transmission. This value is also used by the receiver 70 to determine the number of data octets contained in a received data frame.

TABLE 1

| RATE (4 bits) | Data Rate (Mbps) | Modulation Type | Coding Rate |
|---|---|---|---|
| 1101 | 6 | BPSK | ½ |
| 1111 | 9 | BPSK | ¾ |
| 0101 | 12 | QPSK | ½ |
| 0111 | 18 | QPSK | ¾ |
| 1001 | 24 | 16-QAM | ½ |
| 1011 | 36 | 16-QAM | ¾ |
| 0001 | 48 | 64-QAM | ⅔ |
| 0011 | 54 | 64-QAM | ¾ |

The OFDM SIGNAL symbol 120 is followed by variable number of OFDM DATA symbols 127 which contain actual data information. It can be seen that the long training time will reduce the efficiency of spectrum usage. It is thus useful to have a technique for achieving enhanced training capability with no extra training time required.

SUMMARY OF THE INVENTION

An objective of this invention is to provide a channel response estimation for an OFDM communication system based on a certain normal training symbols plus one virtual training symbol.

To accomplish at least this objective, a method for estimation of channel response begins with receiving at least one preamble symbol of a transmitted data frame. A first channel state information is estimated from the at least one preamble symbol. At least one signalling symbol such as the SIGNAL symbol of the IEEE 802.11(a) standard is received. The signalling symbol is then equalized and a rate factor and a length factor are extracted from the at least one signalling symbol.

The rate factor and the length factor are then verified and a virtual preamble symbol is formed from the rate factor and the length factor if they are correct. A second channel state information is estimated from the at least one preamble symbol and the virtual preamble symbol.

The first channel state information is determined by the equation:

$$\hat{H}_L(k) = \frac{1}{m}\sum_{x=1}^{m}[L_R^x(k)/L_T^x(k)]$$

where:
- $\hat{H}_L(k)$ is the first estimation of channel state information.
- $L_R^x(k)$ is the Fourier Transform of each of the m preamble symbols as received, and
- $L_T^x(k)$ is the Fourier Transform of each of the m expected preamble symbols as transmitted.

The equalization of the at least one signalling symbol is accomplished by performing channel correction by using the first estimation of channel state information and the phase/amplitude information contained in the pilot sub-carriers of the received at least one signalling symbol.

The extraction of a rate factor and a length factor from the equalized at least one signalling symbol begins with de-mapping the at least one signalling symbol. The de-mapped symbol is then de-interleaved and decoded.

The virtual preamble symbol is formed from the rate factor and the length factor by encoding, interleaving, and mapping the extracted rate factor and length factor.

The virtual preamble symbol and the at least one preamble symbol are used to perform the second estimation of channel state information. The second channel estimation is accomplished by the equation:

$$\hat{H}(k) = \frac{1}{m+1}\{\hat{H}_S(k) + m \cdot \hat{H}_L(k)\}$$

where:
- $\hat{H}(k)$ is the second estimation of channel state information.
- $\hat{H}_S(k)=S_R(k)/S_T(k)$. $S_R(k)$ is the Fourier Transform of the virtual preamble symbol (signalling symbol) as received, and $S_T(k)$ is the Fourier Transform of the virtual preamble symbol as transmitted.
- $\hat{H}_L(k)$ is the first estimation of channel state information.

Upon completion of the channel estimation with the normal preamble symbol(s) and the virtual preamble symbol, the data symbols are received and equalized. The equalization of the data symbols is accomplished by performing channel correction on data symbols with the second channel estimation and pilot sub-carriers in each of the plurality of data symbols. The data symbols are then de-mapped, de-interleaved, and decoded to recover the originally transmitted data.

DETAILED DESCRIPTION OF THE INVENTION

Figure 5:
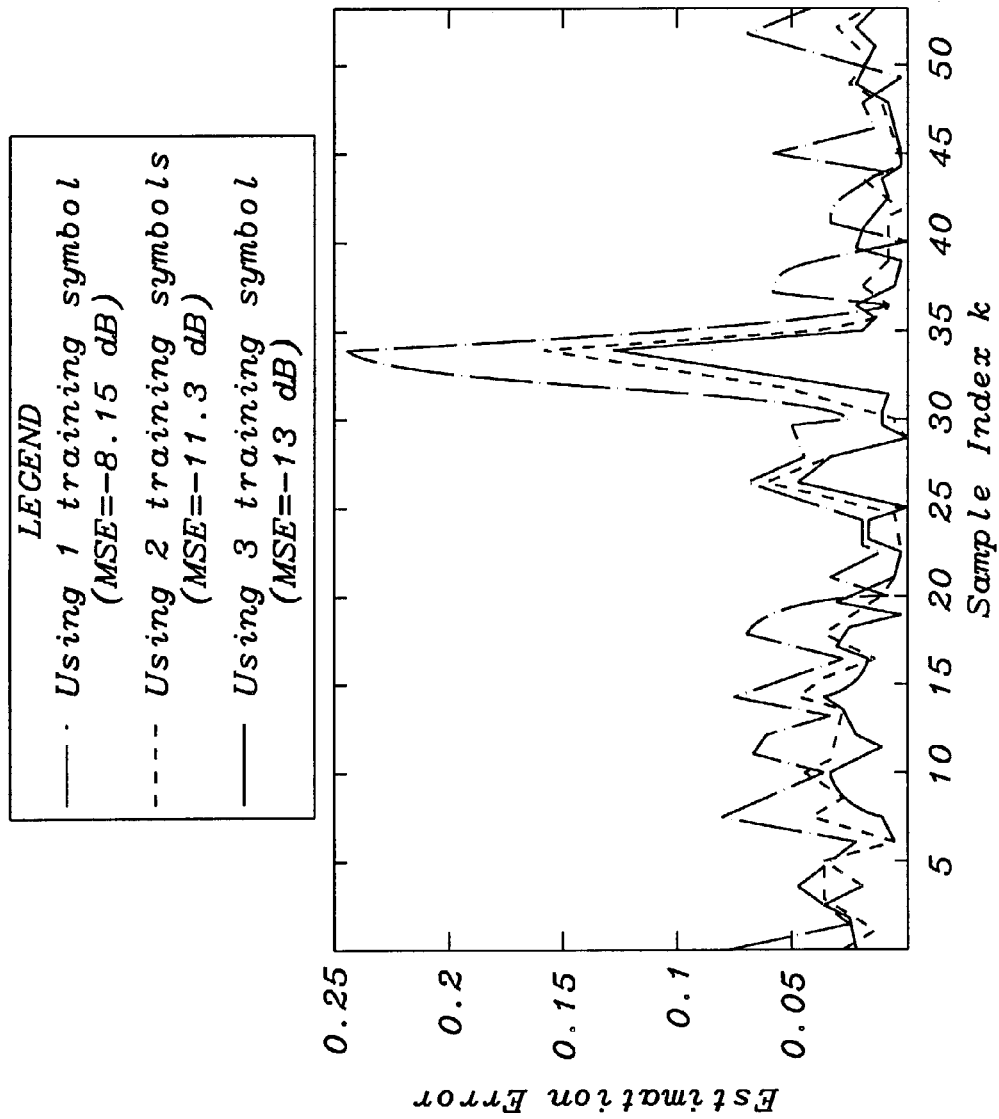
FIG. 5 is a plot of the estimation error versus a sample index for the estimated channel state information employing one, two, or three training symbols.
Figure 6:
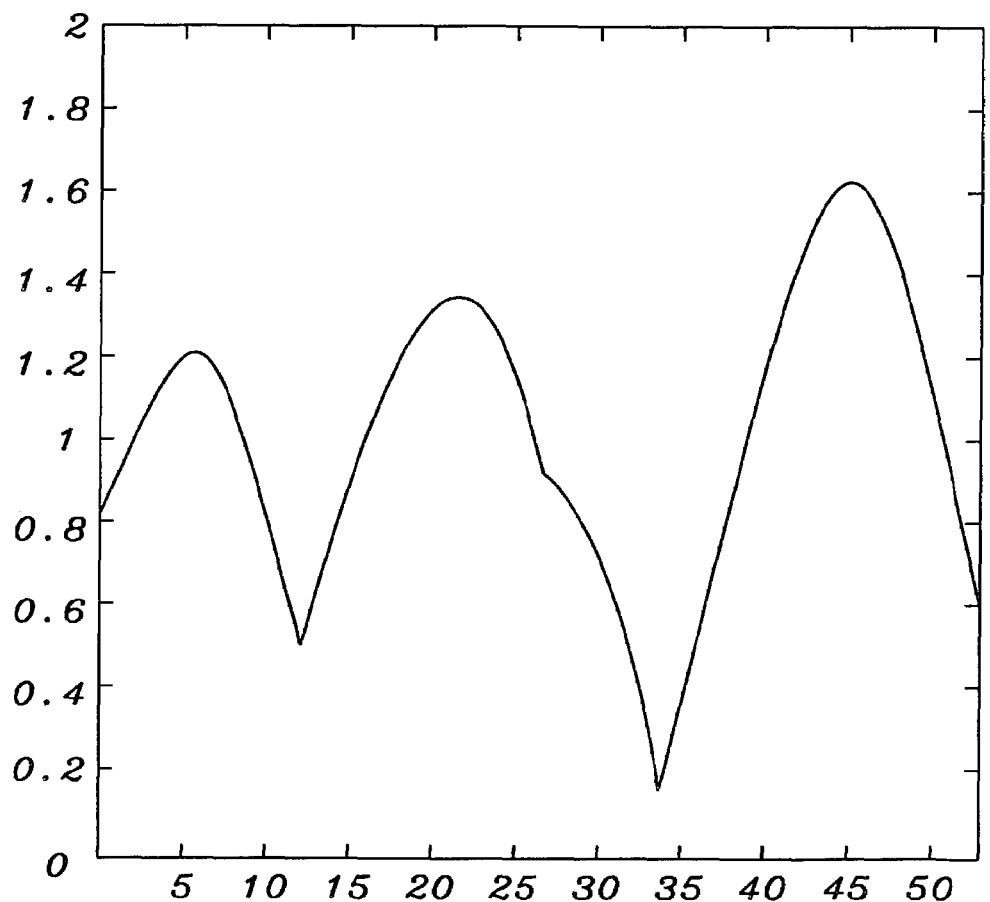
FIG. 6 is a plot of the spectral content of the channel state employed to determine the estimation error of FIG. 5.

As described above, the choice of the number of training symbols is a trade-off between a good channel estimation performance and a short training time. It is thus desirable to have more known symbols in addition to the prescribed training symbols for more accurate channel estimation without extending the training duration. Referring to FIG. 5 and FIG. 6, the plot of FIG. 5 shows the estimation errors when using LS estimation to estimate the channel response which has a normalized spectral content as shown in FIG. 6. It is shown that using one training symbol has a mean square error (MSE) of −8.15 dB, two training symbols has a mean square error of −11.3 dB, and three training symbols would have a mean square error of −13 dB.

Figure 2:
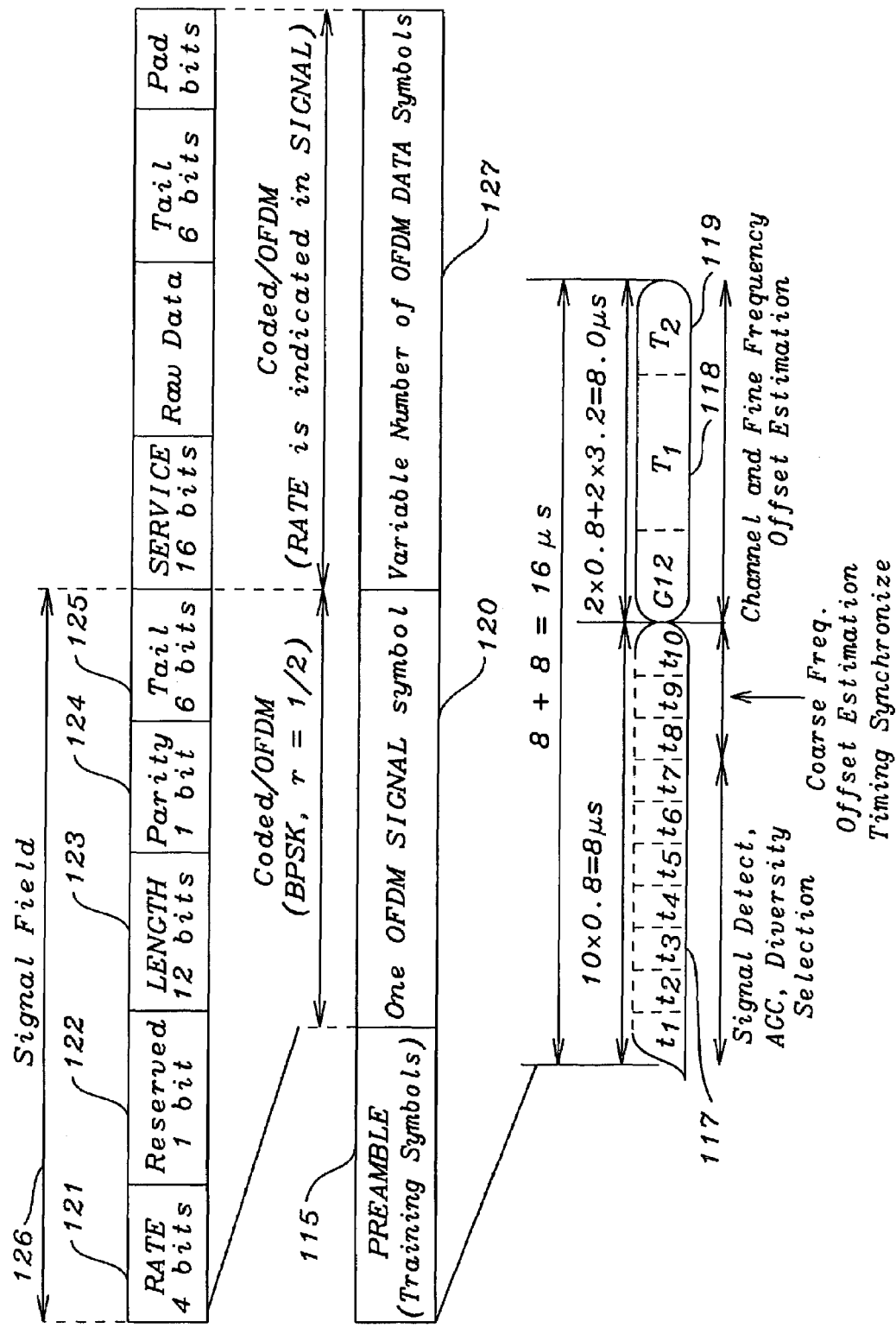
FIG. 2 is a diagram of the physical layer convergence protocol (PLCP) frame format of the IEEE 802.11(a) standard of the prior art.

The frame format, as shown in FIG. 2, of the IEEE 802.11(a) standard has a fixed training structure with two long training symbols 118 and 119 and the content-variable OFDM SIGNAL symbol 120. While the content of the OFDM SIGNAL symbol 120 is variable, its modulation type (BPSK) and encoding rate (R=½) are fixed by the IEEE 802.11(a) standard. Once the training symbols have been used to estimate the channel response, the received SIGNAL symbol 120 maybe equalized, de-mapped, de-interleaved, and decoded to determine the rate factor 121 and the length factor 123. The detected rate factor 121 and length factor 123 are then checked for the correctness with the parity bit 124. The correct rate factor 121 and length factor 123 are then converted to a virtual training symbol by encoding, interleaving and mapping the signal field 126, which is reformed with the detected rate factor 121 and length factor 123.

Figure 3:
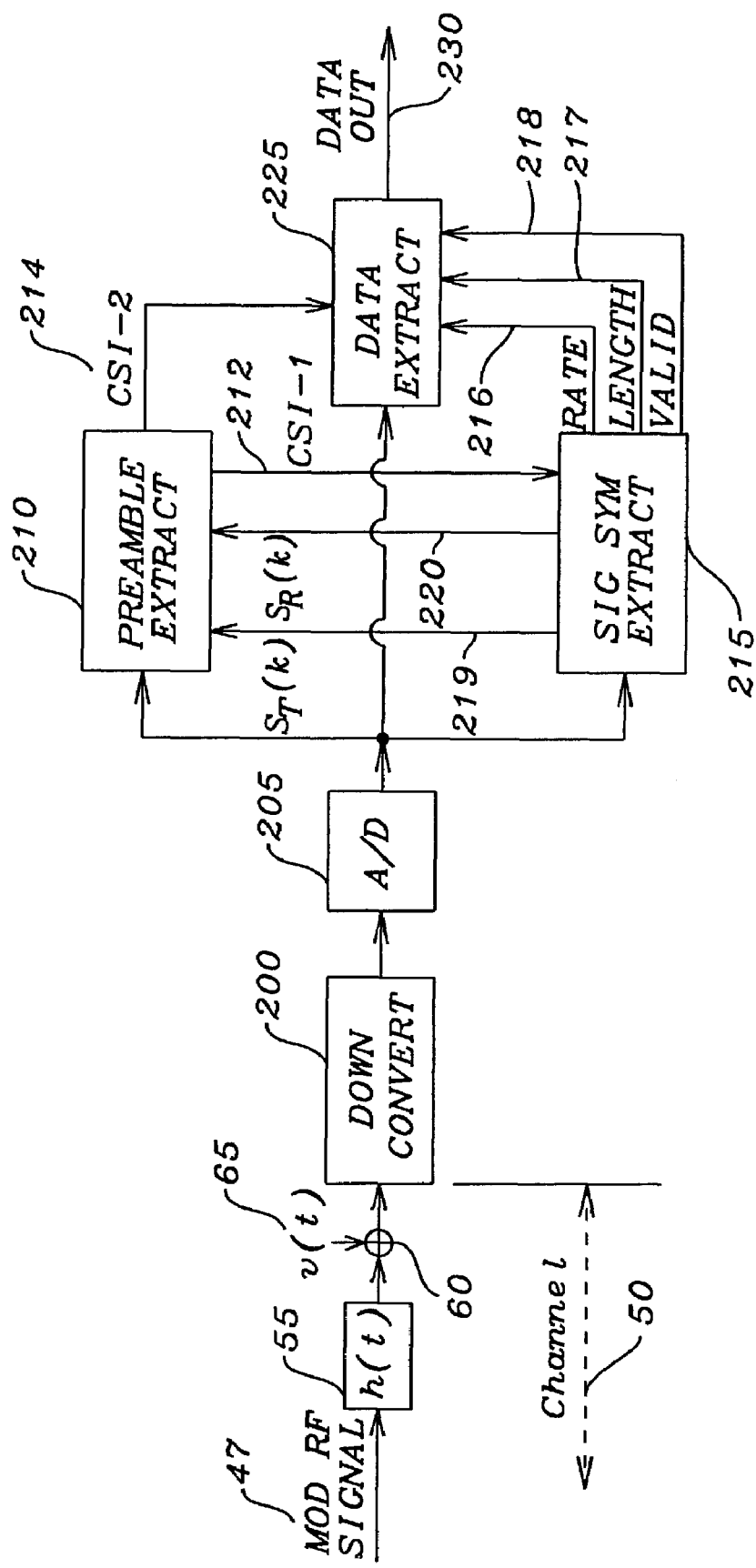
FIG. 3 is a block diagram of an OFDM receiver of this invention.

Refer now to FIG. 3 for a discussion of an OFDM communication receiver of the invention. The transmitted RF signal 47 that is modulated with the transmitted OFDM symbols is put out to the communication channel 50 as described above. The combining effect of the multipath dispersion with a channel impulse response (h(t)) 55 and the additive channel noise (v(t)) 65 modifies the gain and phase of the modulated signal 47 to form the input signal to the down converter 200. The down converter 200 shifts the received input signal from the channel to a baseband signal containing the transmitted OFDM symbols for further processing. The baseband signal is then sampled and converted by the A/D converter 205 to digital samples containing the transmitted OFDM symbols. The preamble extraction device 210 is connected to the A/D converter 205 to receive the preamble of the transmitted data frame. The preamble extraction device 210 then determines the m preamble symbols (m=2, for two long training symbols 118 and 119 in the IEEE 802.11(a) standard) and estimates a first channel state information 212.

The first estimation of channel state information is determined by the equation:

$$\hat{H}_L(k) = \frac{1}{m}\sum_{x=1}^{m}[L_R^x(k)/L_T^x(k)]$$

where:

$\hat{H}_L(k)$ is the first estimation of channel state information.

$L_R^x(k)$ is the Fourier Transform of each of the m preamble symbols as received (m=2, for two long training symbols prescribed in the IEEE 802.11(a) standard), and, $L_T^x(k)$ is the Fourier Transform of each of the m expected preamble symbols as transmitted (m=2, and $L_T^1(k)=L_T^2(k)$ for two identical long training symbols prescribed in the IEEE 802.11(a) standard).

The signalling symbol extraction device 215 is connected to the A/D converter 205 to receive the transmitted OFDM signalling symbol (the OFDM SIGNAL symbol 120 in IEEE 802.11(a) standard). The signalling symbol extraction device 215 is further connected to the preamble extraction device 210 to receive the first estimation of channel state information 212. The received channel state information 212 is used in equalizing the OFDM signalling symbol. The equalized OFDM signalling symbol is then de-mapped, de-interleaved, and decoded to determine the rate factor 216 and the length factor 217. If the rate factor 216 and length factor 217 are verified correct, the signalling symbol extraction device 215 notifies the data extraction device 225 with these factors 216 and 217 as well as a Valid control signal 218 and creates a virtual preamble symbol 219 by encoding, interleaving and mapping the detected rate factor 216 and length factor 217.

The virtual preamble symbol 219 is transferred to the preamble extraction device 210. The virtual preamble symbol 219 and the first channel state information are then combined for estimating a second channel state information 214, which is an update of the first channel state information to form an estimate that is more accurate than the first estimation of channel state information. The second channel state information is determined by the equation:

$$\hat{H}(k) = \frac{1}{m+1}\{\hat{H}_S(k) + m \cdot \hat{H}_L(k)\}$$

where:

$\hat{H}(k)$ is the second estimation of channel state information.

$\hat{H}_S(k)=S_R(k)/S_T(k)$. $S_R(k)$ 220 is the Fourier Transform of the OFDM signalling symbol as received, and $S_T(k)$ 219 is the Fourier Transform of the virtual preamble symbol as transmitted.

$\hat{H}_L(k)$ is the first estimation of channel state information.

Figure 1:
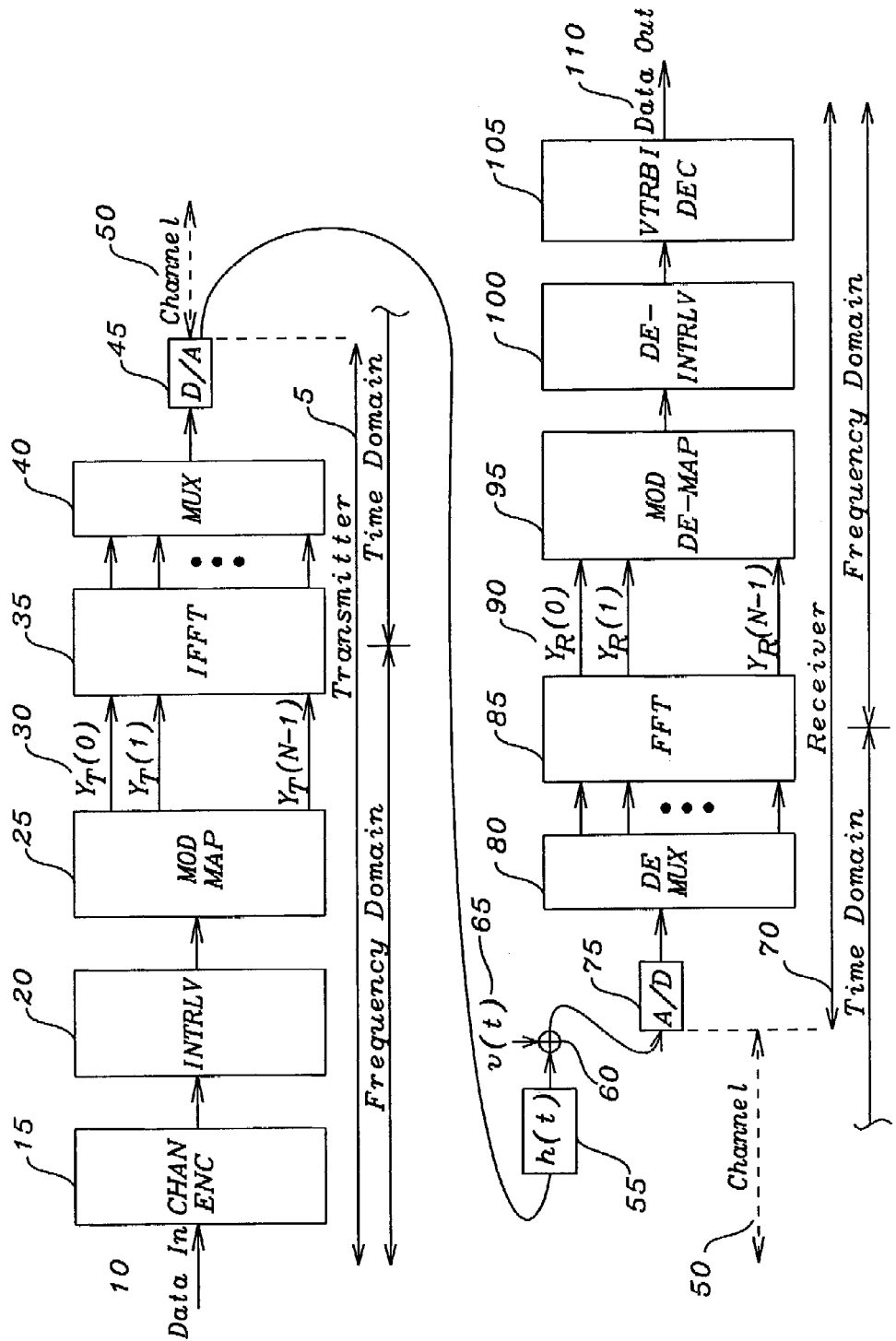
FIG. 1 is a block diagram of an OFDM transmitter and receiver pair similar to that employed for the IEEE 802.11(a) standard of the prior art.

The data extraction device 225 is connected to the A/D converter 205 to receive the transmitted OFDM data symbols 127. The data extraction device 225 is also connected to the preamble extraction device 210 to receive the second channel state information 214. The structure of the data extraction device performs the functions of the demultiplexing circuit 80, the Fast Fourier Transform circuit 85, the Modulation De-Mapping circuit 95, the De-Interleaver circuit 100, and the Viterbi Decoder 105 of FIG. 1. The data symbols are equalized by performing channel correction on data symbols with the second channel estimation 214 and pilot sub-carriers in each of the plurality of data symbols. The data extraction device 225 then recovers the digital data 230 by de-mapped, de-interleaved, and decoded the data symbols.

Figure 4:
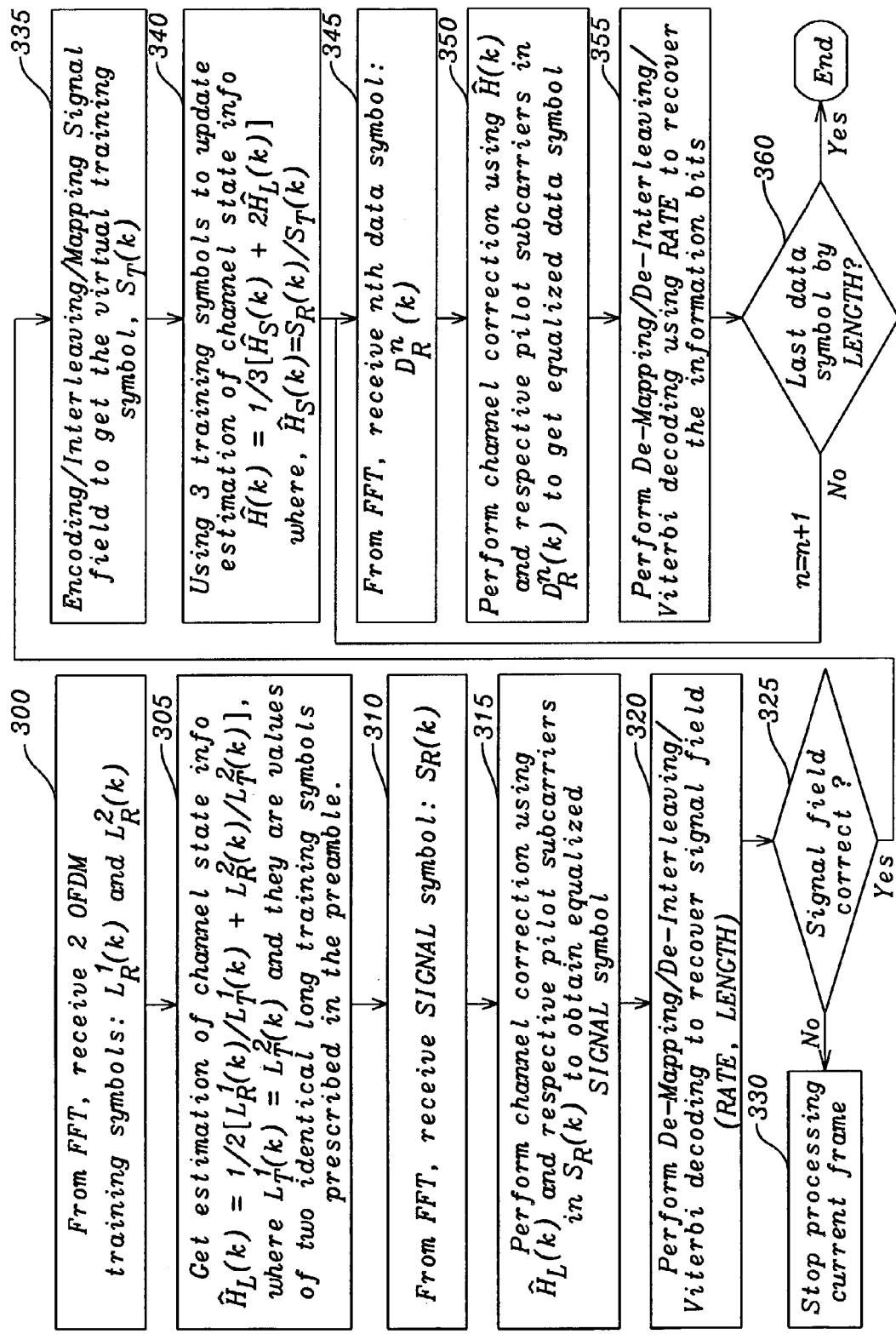
FIG. 4 is a flow chart describing the method for estimating the channel response for an OFDM receiver of this invention.

The receiver may be implemented in an application specific integrated circuit (ASIC) or the functions for the extraction of the preamble symbols, creation of the virtual preamble symbol and the extraction of the digital data maybe implemented as a program process within a digital signal processor or a microprocessor. The method of the program process would be implemented in program code retained in media such as a read only memory (ROM), a flash memory, an electro-optical disk or a magnetic disk and executed by the digital signal processor or the microprocessor. Refer now to FIG. 4 for a discussion of the method for estimating the channel response employing the two long training symbols and the virtual training symbol extracted from the OFDM SIGNAL symbol of this invention.

The transmitted signal which is modulated by the OFDM symbols is received from the channel, down-converted, and sampled to create the received symbols of the OFDM frame. The received symbols are transformed by a Fast Fourier Transform function to the spectral content of the received signals. The Fourier Transform ($L_R^1(k)$ and $L_R^2(k)$) of the two long training symbols 118 and 119 contained in the preamble 115 of FIG. 2 of each data frame are obtained (Box 300) from the Fast Fourier Transform function. The estimation of the first channel state information is calculated (Box 305) by the equation:

$$\hat{H}_L(k) = \frac{1}{2}[L_R^1(k)/L_T^1(k) + L_R^2(k)/L_T^2(k)]$$

where:

$L_T^1(k)=L_T^2(k)$, which are the Fourier Transforms of two identical long training symbols as transmitted.

The Fourier Transform ($S_R(k)$) of the OFDM SIGNAL symbol is obtained (Box 310) from the Fast Fourier Transform function. The $S_R(k)$ is then equalized (Box 315) by using the estimated first channel state information $\hat{H}_L(k)$ and pilot sub-carriers contained within the OFDM SIGNAL symbol. The equalized OFDM SIGNAL symbol is then de-mapped, de-interleaved, and decoded to extract (Box 320) the RATE 121 and the LENGTH 123. The RATE and the LENGTH are checked (Box 325) for validity against the parity bit of the symbol. If the current OFDM SIGNAL symbol is found incorrect, the processing is stopped (Box 330) for the current frame.

If the current OFDM SIGNAL symbol is correct, the signal field 126 reformed with the just detected RATE and LENGTH is encoded, interleaved, and mapped (Box 335) to form a virtual training signal ($S_T(k)$). The original two long training symbols 118 and 119 contained in the preamble 115 of each data frame and the virtual training signal ($S_T(k)$) are used to create (Box 340) a second channel state information $\hat{H}(k)$ as an update of the first channel state information $\hat{H}_L(k)$ according to the equation:

$$\hat{H}(k) = \frac{1}{3}\{\hat{H}_S(k) + 2 \cdot \hat{H}_L(k)\}$$

where:
$\hat{H}_S(k) = S_R(k)/S_T(k)$.

The Fourier Transform $D_R{}^n(k)$ of the nth received OFDM data symbol is obtained (Box 345) from the Fast Fourier Transform function. The $D_R{}^n(k)$ is equalized (Box 350) using the second channel state information (H (k)) and the respective pilot sub-carriers contained in $D_R{}^n(k)$. The equalized $D_R{}^n(k)$ is then de-mapped, de-interleaved, and decoded to recover (Box 355) the information bits conveyed by the nth OFDM data symbol. The number of the processed data symbols is compared to the LENGTH factor of the received OFDM SIGNAL symbol to determine (Box 360) if the last data symbol has been processed. If the last data symbol has not been processed, a symbol counter is incremented and the Fourier Transform $D_R{}^{n+1}(k)$ of the (n+1)th received OFDM data symbol is retrieved (Box 345), equalized (Box 350), de-mapped, de-interleaved, and decoded to recover (Box 355) the information bits conveyed by the (n+1)th OFDM data symbol. When the last data symbol has been processed, the above procedure is completed and halted until receipt of the next data frame.

The method for estimating the channel responses as involved in OFDM communication systems is simple due to the use of low-complexity LS estimation and averaging. Thanks to the half-duplex feature of an OFDM-based WLAN system, those existing blocks 15, 20 and 25 of the transmitter can be "borrowed" for generating the virtual training symbol, $S_T(k)$, and, thus, the improved channel estimation by using three training symbols as shown in FIG. 5, can be achieved with very low hardware implementation penalty. The scheme is also robust for improving the channel estimation, because averaging requires no prior assumption of the channel statistics, which is normally required for developing other complicated yet power inefficient techniques. In addition, the scheme may be easily integrated into a more sophisticated channel estimation and/or correction technique to combat channel distortion further, if necessary.

What is claimed is:

1. A method for estimation of channel responses as involved in OFDM communication systems, comprising the steps of:
   receiving at least one preamble symbol of a transmitted data frame;
   estimating a first channel state information from the at least one preamble symbol;
   receiving at least one signalling symbol;
   equalizing said at least one signalling symbol;
   extracting a rate factor and a length factor from the at least one signalling symbol;
   determining if said rate factor and said length factor are correct;
   if said rate factor and said length factor are correct, forming a virtual preamble symbol from said rate factor and said length factor; and
   estimating a second channel state information from said at least one preamble symbol and said virtual preamble symbol.

2. The method of claim 1 wherein estimating the first channel state information is determined by the equation:

$$\hat{H}_L(k) = \frac{1}{m}\sum_{x=1}^{m}[L_R^x(k)/L_T^x(k)]$$

where:
   $\hat{H}_L(k)$ is the first estimation of channel state information;
   $L_R^x(k)$ is the Fourier Transform of each of the m preamble symbols as received, and
   $L_T^x(k)$ is the Fourier Transform of each of the m expected preamble symbols as transmitted.

3. The method of claim 1 wherein equalizing said at least one signalling symbol comprising the steps of:
   performing Fourier Transform on the at least one signalling symbol; and
   performing channel correction for the Fourier transformed at least one signalling symbol by using the said first channel state information and pilot sub-carriers contained in the Fourier transformed at least one signalling symbol.

4. The method of claim 1 wherein extracting a rate factor and a length factor from the at least one signalling symbol comprising the steps of:
   de-mapping the equalized at least one signalling symbol;
   de-interleaving the equalized at least one signalling symbol; and
   decoding the equalized at least one signalling symbol.

5. The method of claim 1 wherein forming a virtual preamble symbol from said rate factor and said length factor comprising the steps of:
   encoding said rate factor and said length factor;
   interleaving said rate factor and said length factor; and
   mapping said rate factor and said length factor to form said virtual preamble symbol.

6. The method of claim 1 wherein estimating the second channel state information is accomplished by calculating the equation:

$$\hat{H}(k) = \frac{1}{m+1}\{\hat{H}_S(k) + m \cdot \hat{H}_L(k)\}$$

where:
   $\hat{H}(k)$ is the said second estimation of channel state information;
   $\hat{H}_S(k) = S_R(k)/S_T(k)$. $S_R(k)$ is the Fourier Transform of the said virtual preamble symbol as received, and $S_T(k)$ is the Fourier Transform of the said virtual preamble symbol as transmitted;
   $\hat{H}_L(k)$ is the said first estimation of channel state information.

7. The method of claim 1 further comprises the steps of:
   receiving a plurality of data symbols;
   equalizing said plurality of data symbols; and recovering the transmitted information data conveyed by said plurality of data symbols.

8. The method of claim 7 wherein equalizing said plurality of data symbols comprises the steps of:

performing Fourier Transform on said plurality of data symbols; and performing channel correction for the Fourier transformed said plurality of data symbols with the second channel state information and pilot sub-carriers contained in each of the Fourier transformed said plurality of data symbols.

9. The method of claim 7 wherein recovering the transmitted information data conveyed by said plurality of data symbols comprises the steps of:

de-mapping the equalized said plurality of data symbols;
de-interleaving the equalized said plurality of data symbols; and
decoding the equalized said plurality of data symbols.

10. An apparatus for estimation of channel responses as involved in OFDM communication systems, comprising:

means for receiving at least one preamble symbol of a transmitted data frame;

means for estimating a first channel state information from the at least one preamble symbol;

means for receiving at least one signalling symbol;

means for equalizing said at least one signalling symbol;

means for extracting a rate factor and a length factor from the at least one signalling symbol;

means for determining if said rate factor and said length factor are correct;

means for forming a virtual preamble symbol from said rate factor and said length factor, if said rate factor and said length factor are correct; and means for estimating a second channel state information from said at least one preamble symbol and said virtual preamble symbol.

11. The apparatus of claim 10 wherein said means for estimating the first channel state information calculates the equation:

$$\hat{H}_L(k) = \frac{1}{m}\sum_{x=1}^{m}[L_R^x(k)/L_T^x(k)]$$

where:

$\hat{H}_L(k)$ is the first estimation of channel state information;

$L_R^x(k)$ is the Fourier Transform of each of the m preamble symbols as received, and $L_T^x(k)$ is the Fourier Transform of each of the m expected preamble symbols as transmitted.

12. The apparatus of claim 10 wherein said means for equalizing said at least one signalling symbol comprises:

means for performing Fourier Transform on the at least one signalling symbol; and means for performing channel correction for the Fourier transformed at least one signalling symbol by using the said first channel state information and pilot sub-carriers contained in the Fourier transformed at least one signalling symbol.

13. The apparatus of claim 10 wherein said means for extracting a rate factor and a length factor from the at least one signalling symbol comprises:

means for de-mapping the equalized at least one signalling symbol;

means for de-interleaving the equalized at least one signalling symbol; and means for decoding the equalized at least one signalling symbol.

14. The apparatus of claim 10 wherein said means for forming a virtual preamble symbol from said rate factor and said length factor comprises:

means for encoding said rate factor and said length factor;

means for interleaving said rate factor and said length factor; and means for mapping said rate factor and said length factor to form said virtual preamble symbol.

15. The apparatus of claim 10 wherein said means for estimating the second channel state information calculates the equation:

$$\hat{H}(k) = \frac{1}{m+1}\{\hat{H}_S(k) + m \cdot \hat{H}_L(k)\}$$

where:

$\hat{H}(k)$ is the said second estimation of channel state information;

$\hat{H}_S(k)=S_R(k)/S_T(k)$. $S_R(k)$ is the Fourier Transform of the said virtual preamble symbol as received, and $S_T(k)$ is the Fourier Transform of the said virtual preamble symbol as transmitted.

$\hat{H}_L(k)$ is the said first estimation of channel state information.

16. The apparatus of claim 10 further comprising:

means for receiving a plurality of data symbols;

means for equalizing said plurality of data symbols; and means for recovering the transmitted information data conveyed by said plurality of data symbols.

17. The apparatus of claim 16 wherein said means for equalizing said plurality of data symbols comprises:

means for performing Fourier Transform on said plurality of data symbols; and means for performing channel correction for the Fourier transformed said plurality of data symbols with the second channel state information and pilot sub-carriers contained in each of the Fourier transformed said plurality of data symbols.

18. The apparatus of claim 16 wherein said means for recovering the transmitted information data conveyed by said plurality of data symbols comprises:

means for de-mapping the equalized said plurality of data symbols;

means for de-interleaving the equalized said plurality of data symbols; and decoding the equalized said plurality of data symbols.

19. An apparatus for estimation of channel responses as involved in OFDM communication systems, comprising means for executing the steps of:

receiving at least one preamble symbol of a transmitted data frame;

estimating a first channel state information from the at least one preamble symbol;

receiving at least one signalling symbol;

equalizing said at least one signalling symbol;

extracting a rate factor and a length factor from the at least one signalling symbol;

determining if said rate factor and said length factor are correct;

if said rate factor and said length factor are correct, forming a virtual preamble symbol from said rate factor and said length factor; and estimating a second channel state information from said at least one preamble symbol and said virtual preamble symbol.

20. The apparatus of claim 19 wherein estimating the first channel state information is determined by the equation:

$$\hat{H}_L(k) = \frac{1}{m}\sum_{x=1}^{m}\left[\frac{L_R^x(k)}{L_T^x(k)}\right]$$

where:
$\hat{H}_L(k)$ is the first estimation of channel state information;
$L_R^x(k)$ is the Fourier Transform of each of the m preamble symbols as received, and
$L_T^x(k)$ is the Fourier Transform of each of the m expected preamble symbols as transmitted.

21. The apparatus of claim 19 wherein equalizing said at least one signalling symbol comprising the steps of:
performing Fourier Transform on the at least one signalling symbol; and
performing channel correction for the Fourier transformed at least one signalling symbol by using the said first channel state information and pilot sub-carriers contained in the Fourier transformed at least one signalling symbol.

22. The apparatus of claim 19 wherein extracting a rate factor and a length factor from the at least one signalling symbol comprising the steps of:
de-mapping the equalized at least one signalling symbol;
de-interleaving the equalized at least one signalling symbol; and
decoding the equalized at least one signalling symbol.

23. The apparatus of claim 19 wherein forming a virtual preamble symbol from said rate factor and said length factor comprising the steps of:
encoding said rate factor and said length factor;
interleaving said rate factor and said length factor; and
mapping said rate factor and said length factor to form said virtual preamble symbol.

24. The apparatus of claim 19 wherein estimating the second channel state information is accomplished by calculating the equation:

$$\hat{H}(k) = \frac{1}{m+1}\{\hat{H}_S(k) + m \cdot \hat{H}_L(k)\}$$

where:
$\hat{H}(k)$ is the said second estimation of channel state information;
$\hat{H}_S(k) = S_R(k)/S_T(k)$. $S_R(k)$ is the Fourier Transform of the said virtual preamble symbol as received, and $S_T(k)$ is the Fourier Transform of the said virtual preamble symbol as transmitted;
$\hat{H}_L(k)$ is the said first estimation of channel state information.

25. The apparatus of claim 19 wherein the means for executing further performs the steps of:
receiving a plurality of data symbols;
equalizing said plurality of data symbols; and
recovering the transmitted information data conveyed by said plurality of data symbols.

26. The apparatus of claim 25 wherein equalizing said plurality of data symbols comprises the steps of:
performing Fourier Transform on said plurality of data symbols; and
performing channel correction for the Fourier transformed said plurality of data symbols with the second channel state information and pilot sub-carriers contained in each of the Fourier transformed said plurality of data symbols.

27. The apparatus of claim 25 wherein recovering the transmitted information data conveyed by said plurality of data symbols comprises the steps of:
de-mapping the equalized said plurality of data symbols;
de-interleaving the equalized said plurality of data symbols; and
decoding the equalized said plurality of data symbols.

28. An OFDM communication receiver comprising:
a preamble extraction device connected to receive the transmitted OFDM symbols extracted from a down-converted, digitized and demultiplexed communication signal, determining, from the received OFDM symbols, at least one preamble symbol, and from said at least one preamble symbol estimating a first channel state information;
a signalling symbol extraction device connected to receive the transmitted OFDM symbols extracted from a down-converted, digitized and demultiplexed communication signal,
from the received OFDM symbols determining at least one signalling symbol;
from the determined at least one signalling symbol, equalizing said at least one signalling symbol;
from equalized said at least one signalling symbol extracting a rate factor and a length factor;
determining if said rate factor and said length factor are correct; and
if said rate factor and said length factor are correct, forming a virtual preamble symbol from said rate factor and said length factor; and
said signalling symbol extraction device in communication with the preamble extraction device to transfer said virtual preamble symbol to the preamble extraction device for estimating a second channel state information, said second channel state information being more accurate than said first channel state information.

29. The OFDM communication receiver of claim 28 wherein the preamble extraction device estimates the first channel state information following the equation:

$$\hat{H}_L(k) = \frac{1}{m}\sum_{x=1}^{m}\left[\frac{L_R^x(k)}{L_T^x(k)}\right]$$

where:
$\hat{H}_L(k)$ is the first estimation of channel state information;
$L_R^x(k)$ is the Fourier Transform of each of the m preamble symbols as received, and
$L_T^x(k)$ is the Fourier Transform of each of the m expected preamble symbols as transmitted.

30. The OFDM communication receiver of claim 28 wherein the signalling symbol extraction device equalizes said at least one signalling symbol by the steps of:

performing Fourier Transform on the at least one signalling symbol; and performing channel correction for the Fourier transformed at least one signalling symbol by using the said first channel state information and pilot sub-carriers contained in the Fourier transformed at least one signalling symbol.

31. The OFDM communication receiver of claim 28 wherein the signalling symbol extraction device extracts a rate factor and a length factor from the at least one signalling symbol by the steps of:

de-mapping the equalized at least one signalling symbol;
de-interleaving the equalized at least one signalling symbol; and
decoding the equalized at least one signalling symbol.

32. The OFDM communication receiver of claim 28 wherein the signalling symbol extraction device forms a virtual preamble symbol from said rate factor and said length factor by the steps of:

encoding said rate factor and said length factor;
interleaving said rate factor and said length factor; and
mapping said rate factor and said length factor to form said virtual preamble symbol.

33. The OFDM communication receiver of claim 28 wherein the preamble extraction device estimates the second channel state information by calculating the equation:

$$\hat{H}(k) = \frac{1}{m+1}\{\hat{H}_S(k) + m \cdot \hat{H}_L(k)\}$$

where:
$\hat{H}(k)$ is the said second estimation of channel state information;
$\hat{H}_S(k) = S_R(k)/S_T(k)$. $S_R(k)$ is the Fourier Transform of the said virtual preamble symbol as received, and $S_T(k)$ is the Fourier Transform of the said virtual preamble symbol as transmitted;
$\hat{H}_L(k)$ is the said first estimation of channel state information.

34. The OFDM communication receiver of claim 28 further comprising:

a data extraction device connected to receive the transmitted OFDM symbols extracted from a down-converted, digitized and demultiplexed communication signal, determining a plurality of data symbols; equalizing said plurality of data symbols; and recovering the transmitted information data conveyed by said plurality of data symbols.

35. The OFDM communication receiver of claim 34 wherein the data extraction device equalizes said plurality of data symbols by the steps of:

performing Fourier Transform on said plurality of data symbols; and
performing channel correction for the Fourier transformed said plurality of data symbols with the second channel state information and pilot sub-carriers contained in each of the Fourier transformed said plurality of data symbols.

36. The OFDM communication receiver of claim 34 wherein the data extraction device recovers the transmitted information data conveyed by said plurality of data symbols by the steps of:

de-mapping the equalized said plurality of data symbols;
de-interleaving the equalized said plurality of data symbols; and
decoding the equalized said plurality of data symbols.

37. A signal processing system within an OFDM communication receiver that executes a program process for estimation of channel responses as involved in said OFDM communication receiver, said program process executing the steps of:

receiving at least one preamble symbol of a transmitted data frame;
estimating a first channel state information from the at least one preamble symbol;
receiving at least one signalling symbol;
equalizing said at least one signalling symbol;
extracting a rate factor and a length factor from the at least one signalling symbol;
determining if said rate factor and said length factor are correct;
if said rate factor and said length factor are correct, forming a virtual preamble symbol from said rate factor and said length factor; and
estimating a second channel state information from said at least one preamble symbol and said virtual preamble symbol.

38. The signal processing system of claim 37 wherein estimating the first channel state information is determined by the equation:

$$\hat{H}_L(k) = \frac{1}{m}\sum_{x=1}^{m}\left[\frac{L_R^x(k)}{L_T^x(k)}\right]$$

where:
$\hat{H}_L(k)$ is the first estimation of channel state information;
$L_R^x(k)$ is the Fourier Transform of each of the m preamble symbols as received, and
$L_T^x(k)$ is the Fourier Transform of each of the m expected preamble symbols as transmitted.

39. The signal processing system of claim 37 wherein equalizing said at least one signalling symbol comprises the steps of:

performing Fourier Transform on the at least one signalling symbol; and
performing channel correction for the Fourier transformed at least one signalling symbol by using the said first channel state information and pilot sub-carriers contained in the Fourier transformed at least one signalling symbol.

40. The signal processing system of claim 37 wherein extracting a rate factor and a length factor from the at least one signalling symbol comprises the steps of:

de-mapping the equalized at least one signalling symbol;
de-interleaving the equalized at least one signalling symbol; and
decoding the equalized at least one signalling symbol.

41. The signal processing system of claim 37 wherein forming a virtual preamble symbol from said rate factor and said length factor comprises the steps of:

encoding said rate factor and said length factor;
interleaving said rate factor and said length factor; and
mapping said rate factor and said length factor to form said virtual preamble symbol.

42. The signal processing system of claim 37 wherein estimating the second channel state information is accomplished by calculating the equation:

$$\hat{H}(k) = \frac{1}{m+1}\{\hat{H}_S(k) + m \cdot \hat{H}_L(k)\}$$

where:
$\hat{H}(k)$ is the said second estimation of channel state information;
$\hat{H}_S(k)=S_R(k)/S_T(k)$. $S_R(k)$ is the Fourier Transform of the said virtual preamble symbol as received, and $S_T(k)$ is the Fourier Transform of the said virtual preamble symbol as transmitted.
$\hat{H}_L(k)$ is the said first estimation of channel state information.

43. The signal processing system of claim 37 wherein said program process further executes the steps of:
receiving a plurality of data symbols;
equalizing said plurality of data symbols; and
recovering the transmitted information data conveyed by said plurality of data symbols.

44. The signal processing system of claim 43 wherein equalizing said plurality of data symbols comprises the steps of:
performing Fourier Transform on said plurality of data symbols; and
performing channel correction for the Fourier transformed said plurality of data symbols with the second channel state information and pilot sub-carriers contained in each of the Fourier transformed said plurality of data symbols.

45. The signal processing system of claim 43 wherein recovering the transmitted information data conveyed by said plurality of data symbols comprises the steps of:
de-mapping the equalized said plurality of data symbols;
de-interleaving the equalized said plurality of data symbols; and
decoding the equalized said plurality of data symbols.

46. A computer readable medium for storing a program code which, when executed on a signal processing system within an OFDM communication receiver, executes a program process for estimation of channel responses as involved in said OFDM communication receiver, said program process executing the steps of:
receiving at least one preamble symbol of a transmitted data frame;
estimating a first channel state information from the at least one preamble symbol;
receiving at least one signalling symbol;
equalizing said at least one signalling symbol;
extracting a rate factor and a length factor from the at least one signalling symbol;
determining if said rate factor and said length factor are correct;
if said rate factor and said length factor are correct, forming a virtual preamble symbol from said rate factor and said length factor; and
estimating a second channel state information from said at least one preamble symbol and said virtual preamble symbol.

47. The computer readable medium for storing a program code of claim 46 wherein estimating the first channel state information is determined by the equation:

$$\hat{H}_L(k) = \frac{1}{m}\sum_{x=1}^{m}\left[\frac{L_R^x(k)}{L_T^x(k)}\right]$$

where:
$\hat{H}_L(k)$ is the first estimation of channel state information;
$L_R^x(k)$ is the Fourier Transform of each of the m preamble symbols as received, and
$L_T^x(k)$ is the Fourier Transform of each of the m expected preamble symbols as transmitted.

48. The computer readable medium for storing a program code of claim 46 wherein equalizing said at least one signalling symbol comprises the steps of:
performing Fourier Transform on the at least one signalling symbol; and
performing channel correction for the Fourier transformed at least one signalling symbol by using the said first channel state information and pilot sub-carriers contained in the Fourier transformed at least one signalling symbol.

49. The computer readable medium for storing a program code of claim 46 wherein extracting a rate factor and a length factor from the at least one signalling symbol comprises the steps of:
de-mapping the equalized at least one signalling symbol;
de-interleaving the equalized at least one signalling symbol; and
decoding the equalized at least one signalling symbol.

50. The computer readable medium for storing a program code of claim 46 wherein forming a virtual preamble symbol from said rate factor and said length factor comprises the steps of:
encoding said rate factor and said length factor;
interleaving said rate factor and said length factor; and
mapping said rate factor and said length factor to form said virtual preamble symbol.

51. The computer readable medium for storing a program code of claim 46 wherein estimating the second channel state information is accomplished by calculating the equation:

$$\hat{H}(k) = \frac{1}{m+1}\{\hat{H}_S(k) + m \cdot \hat{H}_L(k)\}$$

where:
$\hat{H}(k)$ is the said second estimation of channel state information;
$\hat{H}_S(k)=S_R(k)/S_T(k)$. $S_R(k)$ is the Fourier Transform of the said virtual preamble symbol as received, and $S_T(k)$ is the Fourier Transform of the said virtual preamble symbol as transmitted;
$\hat{H}_L(k)$ is the said first estimation of channel state information.

52. The computer readable medium for storing a program code of claim 46 wherein said program process further executes the steps of:
receiving a plurality of data symbols;
equalizing said plurality of data symbols; and
recovering the transmitted information data conveyed by said plurality of data symbols.

53. The computer readable medium for storing a program code of claim 52 wherein equalizing said plurality of data symbols comprises the steps of:
  performing Fourier Transform on said plurality of data symbols; and
  performing channel correction for the Fourier transformed said plurality of data symbols with the second channel state information and pilot sub-carriers contained in each of the Fourier transformed said plurality of data symbols.

54. The computer readable medium for storing a program code of claim 52 wherein recovering the transmitted information data conveyed by said plurality of data symbols comprises the steps of:
  de-mapping the equalized said plurality of data symbols;
  de-interleaving the equalized said plurality of data symbols; and
  decoding the equalized said plurality of data symbols.

* * * * *